(12) United States Patent
Futamura et al.

(10) Patent No.: US 6,884,326 B2
(45) Date of Patent: Apr. 26, 2005

(54) PROCESS FOR PRODUCTION OF HYDROGEN USING NONTHERMAL PLASMA

(75) Inventors: Shigeru Futamura, Tsukuba (JP); Hajime Kabashima, Tsukuba (JP); Hisahiro Einaga, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 364 days.

(21) Appl. No.: 10/093,533

(22) Filed: Mar. 11, 2002

(65) Prior Publication Data

US 2002/0175084 A1 Nov. 28, 2002

(30) Foreign Application Priority Data

May 22, 2001 (JP) ........................................ 2001-153165

(51) Int. Cl.[7] .............................................. B01J 19/08
(52) U.S. Cl. .................................. 204/164; 423/648.1
(58) Field of Search ........................ 204/164; 423/648.1

(56) References Cited

U.S. PATENT DOCUMENTS

| | | | | |
|---|---|---|---|---|
| 3,933,608 A | * | 1/1976 | Haas et al. | 204/164 |
| 6,159,432 A | * | 12/2000 | Mallinson et al. | 422/186.04 |
| 6,245,309 B1 | * | 6/2001 | Etievant et al. | 423/248 |

FOREIGN PATENT DOCUMENTS

| | | |
|---|---|---|
| DE | 196 21 653 A1 | 12/1997 |
| JP | 2934861 | 6/1999 |
| JP | 2000-095501 | 4/2000 |
| WO | WO 98/28223 A1 | 7/1998 |
| WO | WO 98/30524 A1 | 7/1998 |
| WO | WO 99/11572 A1 | 3/1999 |
| WO | WO 01/00310 A2 | 1/2001 |
| WO | WO 01/33056 A1 | 5/2001 |

* cited by examiner

Primary Examiner—Kishor Mayekar
(74) Attorney, Agent, or Firm—Birch, Stewart, Kolasch & Birch, LLP

(57) ABSTRACT

A method of producing a synthesis gas by a reforming reaction of an organic compound with a reforming agent, in which the reforming reaction is performed using nonthermal plasma.

6 Claims, 4 Drawing Sheets

1 : Feed gas   2 : Background gas   3 : Reforming agent
4 : Control system for gas flow rate   5 : Evaporating system for feed gas
6 : Nonthermal plasma apparatus for producing synthesis gas
7 : System for analysis
8 : Apparatus for separation and recovery of synthesis gas

PROCESS FOR PRODUCTION OF HYDROGEN USING NONTHERMAL PLASMA

FIELD OF THE INVENTION

The present invention relates to a method of efficiently producing a synthesis gas from an organic compound using a reforming agent, such as water, oxygen, or carbon dioxide.

BACKGROUND OF THE INVENTION

Synthesis gas (a mixed gas of hydrogen and carbon monoxide) is an important raw material of liquid fuels and chemicals. Synthesis gas is ordinarily produced by modification of a natural gas or naphtha.

As a method to produce a synthesis gas from a natural gas (one contains methane as a primary component) as a raw material, a method of using water (steam reforming method), a method of partially oxidizing by use of air or oxygen (partial oxidation reforming method), and a method of using carbon dioxide (carbon dioxide reforming method) are generally known. These reforming reactions are performed under such extreme conditions as a high temperature of 800 to 1100° C. and a high pressure of 10 to 30 atm, in the presence of a catalyst (in the steam reforming method and the carbon dioxide reforming method), or no catalyst (in the partial oxidation reforming method). These methods have the problem that 20 to 40% of the raw material is consumed by burning (combustion), because these methods keep a reactor at a high temperature. Further, there is the problem that construction of a reactor able to bear such extreme conditions as a high temperature and a high pressure, results in high product for the entire device.

It is assumed that, if a synthesis gas can be produced by a continuous reforming reaction of the above-mentioned materials under conditions of ordinary temperature and pressure, the production cost of the synthesis gas will be reduced. However, at present, no satisfactory production method has been established.

SUMMARY OF THE INVENTION

The present invention is a method of producing a synthesis gas by a reforming reaction of an organic compound with a reforming agent, in which the reforming reaction is performed using nonthermal plasma.

Other and further features and advantages of the invention will appear more fully from the following description, take in connection with the accompanying drawings.

DETAILED DESCRIPTION OF THE INVENTION

Figure 1:
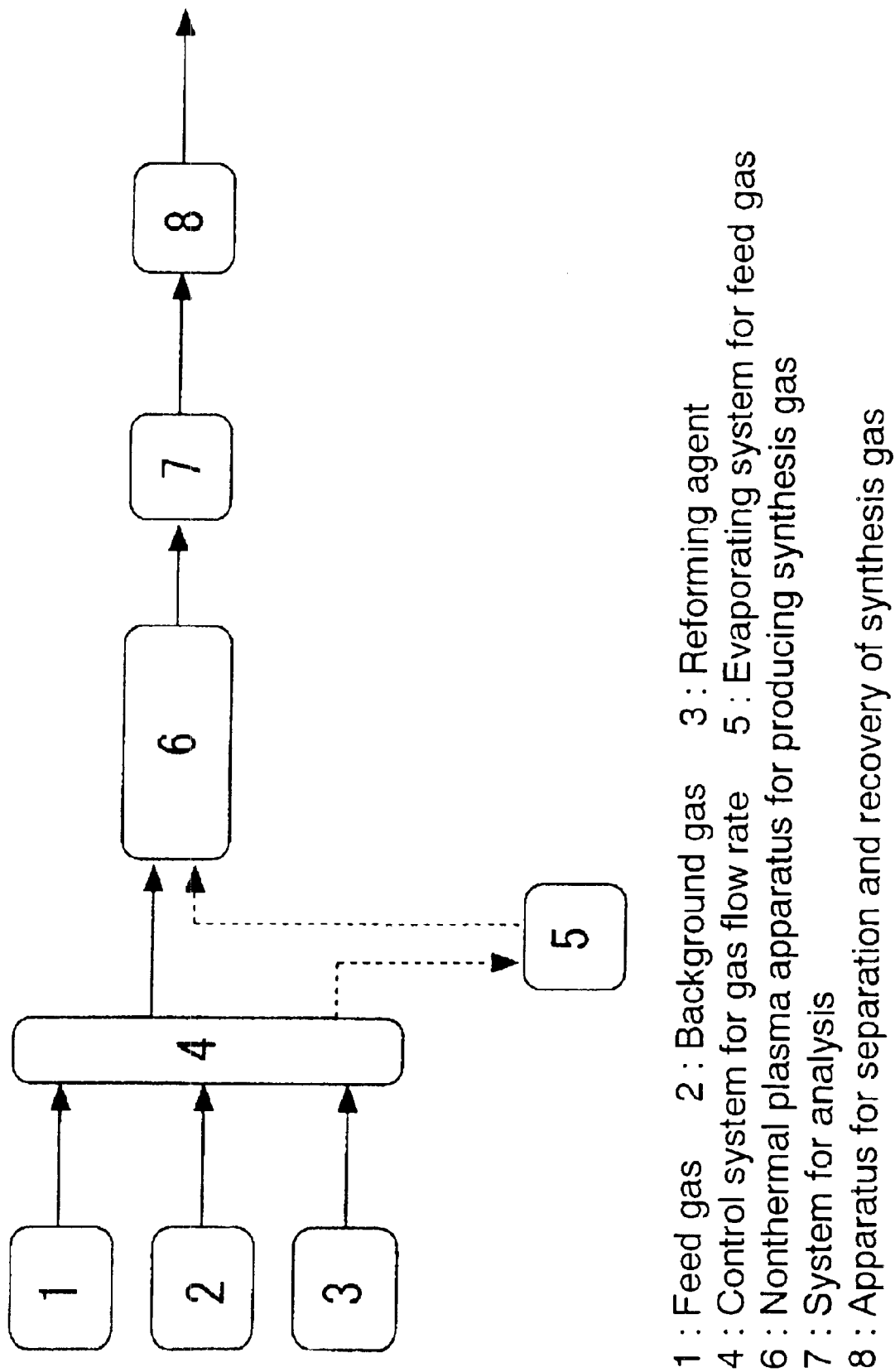
FIG. 1 is a flowchart diagram illustrating a typical example of the synthesis gas production method of the present invention.

The present inventors have intensively studied to find a method of producing a synthesis gas by reforming (modifying) organic compounds (for example, hydrocarbons, such as methane, ethane, and propane) in the presence of a reforming agent, such as water, air, oxygen, or carbon dioxide. As a result, we have found that, if the above-said reforming reaction is performed using nonthermal plasma, these organic compounds are continuously reformed, and a synthesis gas is highly selectively produced. The present invention has been accomplished based on such finding.

That is, the following means are provided according to the present invention:

(1) A method of producing a synthesis gas by a reforming reaction of an organic compound with a reforming agent, wherein the reforming reaction is performed using nonthermal plasma.

(2) The method of producing a synthesis gas according to item (1), wherein the organic compound is a hydrocarbon.

(3) The method of producing a synthesis gas according to item (2), wherein the hydrocarbon is an aliphatic hydrocarbon.

(4) The method of producing a synthesis gas according to any one of items (1) to (3), wherein the reforming agent is at least one substance selected from the group consisting of water, air, oxygen, and carbon dioxide.

(5) The method of producing a synthesis gas according to any one of items (1) to (4), wherein the reforming reaction is performed continuously.

The raw material that can be used in the synthesis gas production method of the present invention may be any organic compound that is ordinarily used for such a reforming reaction. Examples of the organic compound include natural gases, naphtha hydrocarbons, alcohols, aldehydes, ethers, and esters.

Organic compounds that have a chemical bond that is more easily cleaved than a hydrocarbon have high reactivity, and they may be singly used. However, two or more kinds of these organic compounds may be used in combination.

Any kinds of volatile hydrocarbons may be used. Examples of such hydrocarbons include aliphatic hydrocarbons, such as saturated aliphatic hydrocarbons and unsaturated aliphatic hydrocarbons. The saturated aliphatic hydrocarbons are preferably those having 1 to 5 carbon atoms, and more preferably those having 1 to 2 carbon atoms. As saturated aliphatic hydrocarbons, in addition to methane, ethane, propane, and the like, 2,2-dimethylpropane, which is high in content of hydrogen per molecule, is also useful. The unsaturated aliphatic hydrocarbons are preferably those having 2 to 6 carbon atoms, and more preferably those having 2 to 3 carbon, atoms. Examples of unsaturated aliphatic hydrocarbons include ethylene, propylene, propyne, butylene s, butadiene, and the like.

The hydrocarbons that are preferably used in the present invention are saturated aliphatic hydrocarbons, such as methane, ethane, and propane.

As the alcohols, saturated alcohols and unsaturated alcohols may be used. The saturated alcohols are preferably those having 1 to 4 carbon atoms, and more preferably those having 1 to 2 carbon atoms. Examples of saturated alcohols include methanol, ethanol, propanol, butanol, and ethyleneglycol. The unsaturated alcohols are preferably those having 2 to 4 carbon atoms, and more preferably those having 2 to 3 carbon atoms. Examples of unsaturated alcohols include allyl alcohol.

The alcohols that can be preferably used in the present invention are methanol, ethanol, propanol, and butanol.

The aldehydes are preferably those having 1 to 4 carbon atoms, and more preferably those having 1 to 3 carbon atoms. Examples of aldehydes include formaldehyde, acetaldehyde, propionaldehyde, and crotonaldehyde. The ethers are preferably those having 2 to 4 carbon atoms, and more preferably those having 2 to 3 carbon atoms. Examples of ethers include dimethyl ether, methylethylether, and methyl t-butylether. The esters are preferably those having 3 to 4 carbon atoms, and more preferably those having 3 to 4 carbon atoms. Examples of esters include methyl acetate, methyl propionate, and ethyl acetate.

The reforming agent that can be used in the synthesis gas production method of the present invention may be any reforming agent that is ordinarily used for such a reforming reaction. Examples of the reforming agent include water, air, oxygen, carbon dioxide. A preferable reforming agent in descending order is: water>air or oxygen>carbon dioxide.

The reforming agent is preferably mixed in a background gas so as to become a concentration of 0.5 to 2.5 vol %. Further, molar ratio of the reforming agent to the raw material is preferably 0.5 to 2.5 (reforming agent/raw material).

The molar ratio of hydrogen to carbon monoxide in a synthesis gas depends on the atomic ratio of hydrogen to carbon incorporated in an organic compound as a raw material. However, the molar ratio can be controlled to a desired value by a reforming agent and/or a generation method of nonthermal plasma.

Further, the molar ratio of hydrogen to carbon monoxide may also be controlled by selection of the reforming agent, such as water or carbon dioxide, or by adjusting the concentration ratio of a reforming agent to a raw material.

Further, the molar ratio of hydrogen to carbon monoxide may also be controlled by the structure of the plasma reactor, the background gas, the gas flow rate, or the like.

A decomposition reaction of the above-described raw material compound according to the method of the present invention is carried out using nonthermal plasma.

The term "nonthermal plasma" as used herein refers to plasma wherein electrons, ions, and neutral molecules are not in a thermal equilibrium state. A nonthermal plasma apparatus has such a merit that electron temperature reaches the range of 8000 to 40,000° C., while gas temperature can be suppressed to about room temperature.

As a nonthermal plasma reaction apparatus, a conventionally known apparatus can be used without any particular limitation. Such a nonthermal plasma apparatus include, for example, pulsed corona type, silent discharge type, and packed-bed type apparatuses.

In the present invention, it is particularly advantageous to use a nonthermal plasma apparatus of the type that is packed with ferroelectric pellets, since the electron temperature in the reactor can be kept high. The electron temperature is preferably within the range of 8,000 to 40,000° C. A dielectric constant of the ferroelectric substance may be properly selected, and generally in the range of 1,000 to 15,000, and preferably in the range of 3,000 to 10,000, at room temperature. A loading voltage is usually. 3.0 to 10.0 kV, and preferably 5.0 to 8.0 kV, since an excessively high voltage makes conductivity in the reactor too high so that the so-called breakdown phenomenon takes place to make it impossible to initiate microdischarge in the reactor.

A reforming reaction according to the method of the present invention is carried out generally at a temperature range of room temperature to about 200° C., and preferably at a temperature range of room temperature to about 100° C. A concentration of the reforming substance can be adjusted by its vapor pressure. Elevation of temperature during the reforming reaction is generally about 1 to 2° C., in case of the reaction at around room temperature.

In the present invention, the reforming reaction may be performed by directly introducing the above-described raw materials into a nonthermal plasma reaction apparatus. However, preferably an inert gas (for example, nitrogen gas, argon gas, or the like) is additionally used, as a background gas, during the reforming reaction.

To carry out the reforming reaction according to the present invention, preferably a reaction gas prepared by previously mixing the above-described compound to be processed, together with a background gas, is introduced into a nonthermal plasma reactor.

Hydrogen yield is considerably influenced by the concentration of the reaction gas and the flow rate of the gas. The amount of a synthesis gas to be produced per unit time can be optimized by increasing both the concentration of a material to be modified and the flow rate of the gas. The raw material is mixed into a background gas so as to become a concentration of generally 0.5 vol % or more, and preferably 2 to 3 vol % or more. A reaction pressure to be applied is not particularly limited, but a low pressure up to about 5 atm pressure is preferable, and an ordinary pressure (1 atm) is more preferable.

In the present invention, a catalyst is not necessary but may be used. Examples of the catalyst that can be used in the present invention include noble metals, such as gold and platinum; and metal composites, such as nickel-series catalysts, ruthenium-series catalysts, iron-chromium-series catalysts, and copper-zinc-series catalysts.

In the present invention, a molar ratio of hydrogen to carbon monoxide in the synthesis gas can be controlled using a copper-zinc-series catalyst.

A production reaction of synthesis gas containing hydrogen by means of nonthermal plasma according to the present invention can be performed by either a batch system or a continuous system. In the present invention, a continuous system is preferably used, because, according to the present invention, the reforming reaction by nonthermal plasma can be stably performed, and there is no reduction in yield of the synthesis gas, even with a continuous system.

FIG. 1 is a flowchart illustrating a typical example of a continuous process of the present invention for producing synthesis gas with nonthermal plasma. In FIG. 1, 1 denotes a feed gas of a raw material organic compound, 2 denotes a background gas, 3 denotes a reforming agent (an oxidant), 4 denotes a control system for gas flow rate, 5 denotes an evaporating system for the feed gas, 6 denotes a nonthermal plasma apparatus for producing synthesis gas, 7 denotes a system for analysis, and 8 denotes an apparatus for separation and recovery of synthesis gas.

The feed gas 1 is preferably mixed with the background gas 2 and the reforming agent 3, and the resultantly mixed gas is introduced into the control system for gas flow rate 4 equipped with a flow meter, through a stop valve, a flow control valve, and the like (these are not shown in FIG. 1). The mixed gas containing the feed gas, the background gas (if necessary), and reforming agent is then introduced into the nonthermal plasma apparatus for producing synthesis gas 6 where the decomposition reaction is carried out to produce a gas containing synthesis gas. The resultant gas containing synthesis gas is analyzed by the system for analysis 7, such as a gas chromatography, where a gas composition of the reacted gas is determined. The gas thus analyzed is conveyed to the apparatus for separation and recovery of synthesis gas 8 where each component of the produced synthesis gas is isolated and recovered. A waste gas other than synthesis gas is finally treated in a waste gas treatment system (not shown). The evaporating system 5 is used in the event the feed gas and/or the reforming agent is a liquid, for example, water or an alcohol.

Examples of a continuous-type reaction apparatus include pulsed corona type, silent-discharge-type, and packed-bed-type reaction apparatuses. A packed-bed-type reaction apparatus, or the like, is preferably used.

In the method of producing a synthesis gas by means of nonthermal plasma according to the present invention, in addition to hydrogen and carbon monoxide, carbon dioxide and/hydrocarbons (such as ethylene and acetylene) are produced as byproducts from a starting or compound (raw material). These byproducts may be contained in the synthesis gas, as long as they do not deteriorate the property of the synthesis gas.

According to the present invention, a synthesis gas can be obtained from an organic compound, with a reforming agent, such as water, air, oxygen, or carbon dioxide, easily at a high yield.

Further, according to the present invention, an organic compound is so efficiently reformed under moderate conditions that a synthesis gas can be produced at high selectivity and high yield.

The present invention will be described in more detail based on examples given below, but the present invention is not limited by these examples.

EXAMPLES

Examples 1 to 3

Following the flowchart illustrated in FIG. 1, methane (Example 1), ethane (Example 2), and propane (Example 3) were each subjected to steam reforming (reforming agent: water), using nonthermal plasma.

Specifically, steam reforming of methane (Example 1), ethane (Example 2), and propane (Example 3) was performed using a packed-bed type nonthermal plasma reactor filled with pellets of a ferroelectric substance (distance between electrodes, 1.54 cm), which was barium titanate ($BaTiO_3$) (particle size, 1 mm) having a dielectric constant of 5,000 at room temperature.

50 Hz alternating voltage was applied between both electrodes, and consumed electric power at the primary side was measured by means of a digital powermeter. SED (Specific energy density) was calculated as the ratio of the above-mentioned consumed electric power and the rate of gas flow. A dry nitrogen gas was used as a background gas, and water was added, by an associated (entrained) evaporation of hydrocarbon and distilled water placed in a wash-bottle of small size, to prepare a reaction gas. The moisture density was adjusted by means of a dew point hygrometer. A reaction gas containing a concentration of 1 volt of methanol, ethanol, or propane, was used. The rate of gas flow was adjusted to 0.1 L/min (residence time of gas, 44 seconds). Relatively high molecular weight byproducts were identified by means of GC-MS (Shimadzu GC-MS QP 5050A (trade name)) equipped with a capillary column (DB-1). Quantitative analysis of organic byproduct having a relatively high boiling point was carried out by means of GC (GL Science, GC-353, TC-1 (trade names)) equipped with FID (flame ionization detector). On the other hand, quantitative analysis of hydrocarbons having carbon atoms of two or less as well as CO and $CO_2$, was carried out by means of GC (Shimadzu GC-9A, Porapak Q+N, Molecular Sieve 13X (trade names)) equipped with TCD (thermal conductivity detector) and FID. Quantitative analysis of $H_2$ was carried out by means of GC (Shimadzu GC-14, Porapak Q (trade names)) equipped with TCD.

Figure 2:
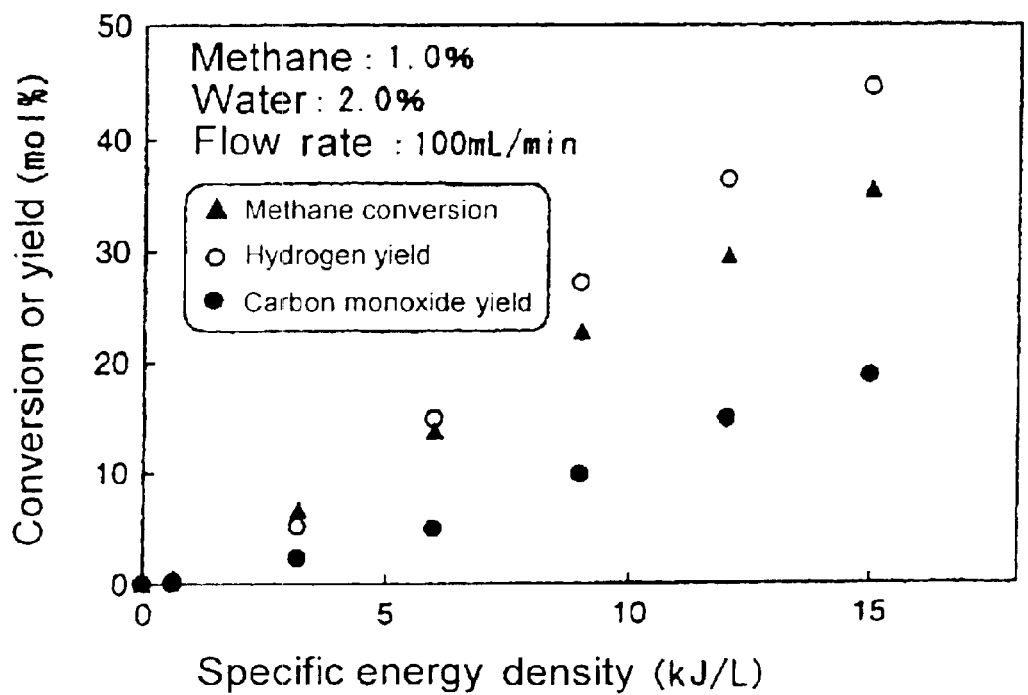
FIG. 2 is a graph showing a degree of methane conversion and yields of hydrogen and carbon monoxide, each plotted against specific energy density (SED; Plug-in power (kW)/ Gas flow rate (L/s)) in Example 1.

Degree of methane conversion and yields of hydrogen and carbon monoxide, each plotted against SED in Example 1, are shown in FIG. 2. From FIG. 2, it can be understood that, in the steam reforming of methane, both the degree of methane conversion and yield of the synthesis gas (hydrogen and carbon monoxide) increased with the value of SED.

When the SED value became 6 kJ/L or greater, the hydrogen selectivity values, calculated based on the degree of methane conversion, were more than 100%. When the SED value was 15 kJ/L, degree of methane conversion and yields of hydrogen and carbon monoxide were 35%, 44%, and 19%, respectively. Further, it was confirmed that, when the SED value was increased up to 150 kJ/L, the degree of methane conversion became 90% or more.

Figure 3:
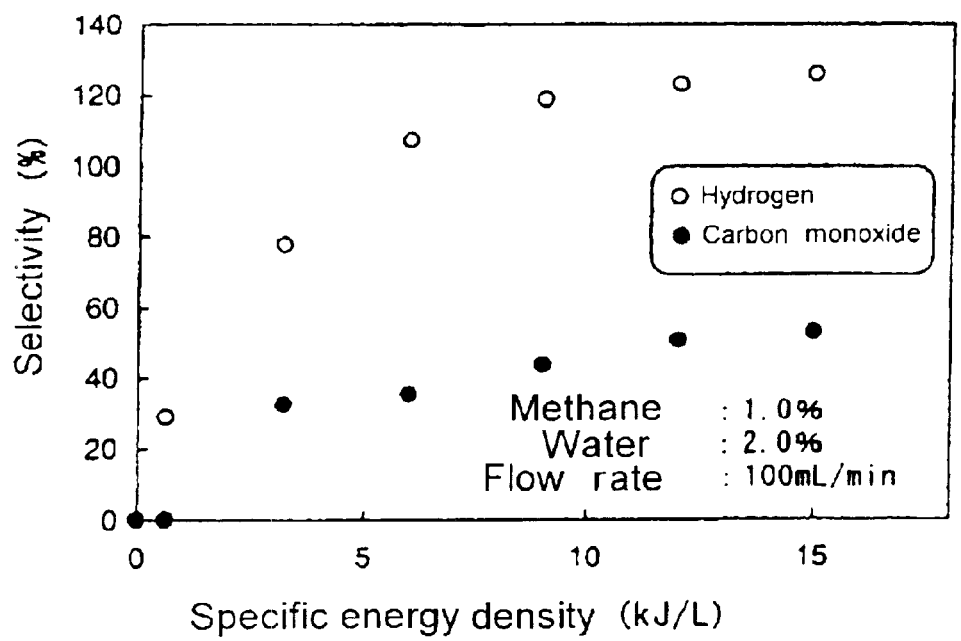
FIG. 3 is a graph showing selectivity of hydrogen and carbon monoxide, each plotted against SED in Example 1.
Figure 4:
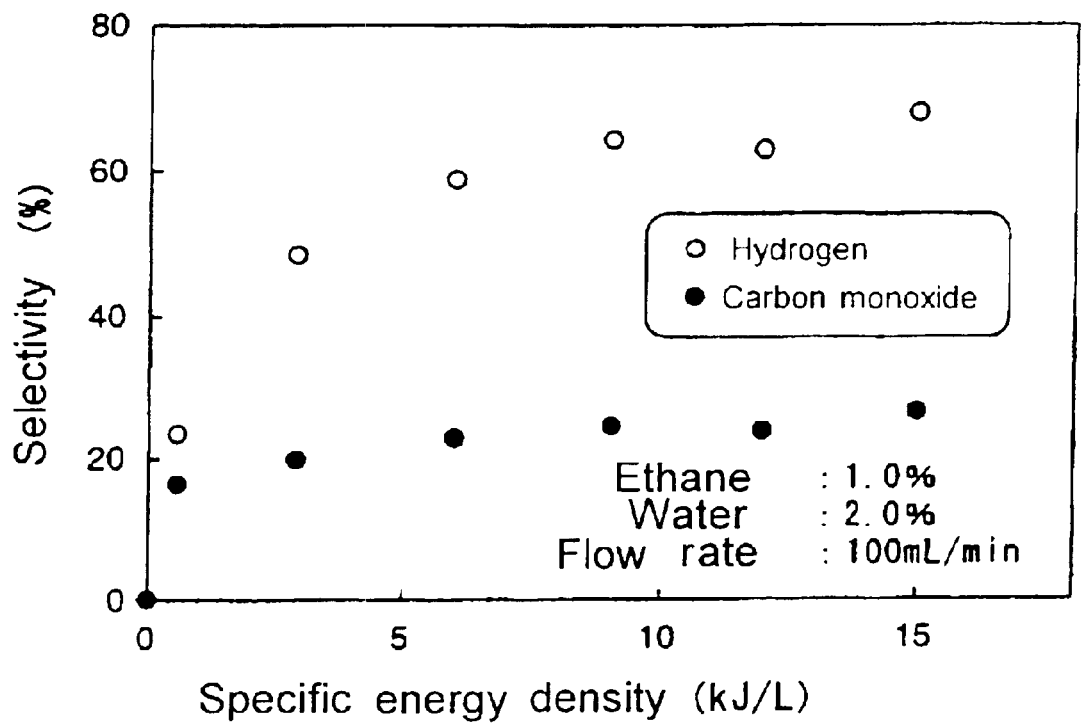
FIG. 4 is a graph showing selectivity of hydrogen and carbon monoxide, each plotted against SED in Example 2.
Figure 5:
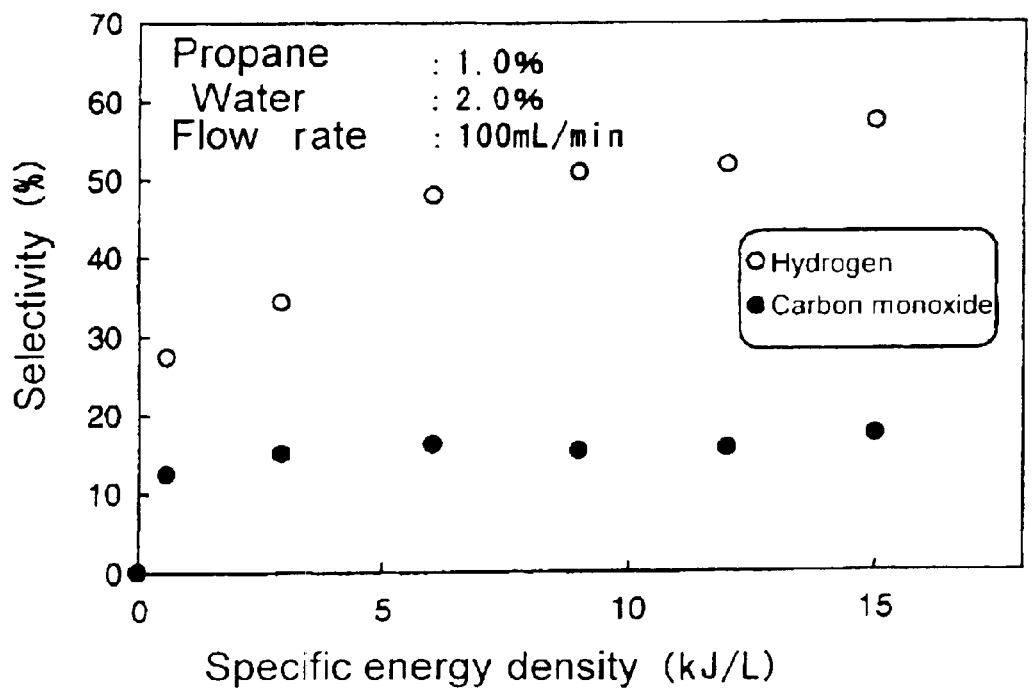
FIG. 5 is a graph showing selectivity of hydrogen and carbon monoxide, each plotted against SED in Example 3.

Selectivity of the synthesis gas produced by each steam reforming in Examples 1, 2, and 3, are shown in FIG. 3, FIG. 4, and FIG. 5, respectively. From these figures, it can be understood that values of selectivity of the synthesis gas in Examples 1, 2, and 3 were increased as the SED value was increased.

The "hydrogen selectivity" in the present specification and claims means one obtained from the equation shown below.

Hydrogen selectivity=(amount of hydrogen obtained by reforming reaction)/(theoretical maximum amount of hydrogen that is calculated from amount of converted raw material).

With respect to hydrogen selectivity value of 100% or more, it is believed that these values can be explained as follows: the values became larger than 100% because not only hydrogen derived from a raw material, but also hydrogen derived from a reforming agent was included in the total hydrogen obtained by reforming reaction.

The carbon monoxide selectivity can be obtained in the same manner using the above equation, except for replacing hydrogen with carbon monoxide.

Hydrogen selectivity and carbon monoxide selectivity were dependent on the structure of the material to be reformed. The hydrogen selectivity values, when the SED value was 15 kJ/L, were 126% (methane), 68% (ethane), and 58% (propane), respectively. On the other hand, the carbon monoxide selectivity values were 53% (methane), 26% (ethane), and 17% (propane), respectively.

Further, it was found that, in the steam reforming of methane, ethane, and propane, when the values at the same SED value were compared, the generation amounts of hydrogen and carbon monoxide were larger in the following order: Methane<Ethane<Propane. It is assumed that this is because the contents of hydrogen atom and carbon atom in the substance increase in the above-mentioned order.

Example 4

The same steam reforming of methane as in Example 1 was repeated, except that the water/methane ratio was changed.

Figure 6:
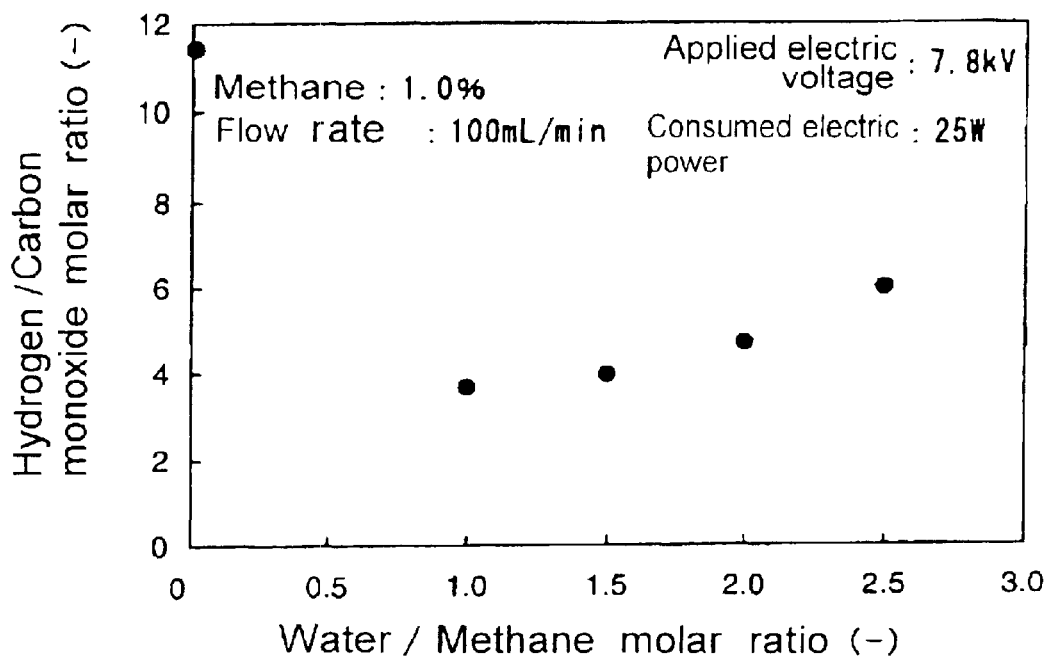
FIG. 6 is a graph showing a molar ratio of hydrogen to carbon monoxide, each plotted against a ratio of water to methane in Example 1.

The thus-obtained results are shown in FIG. 6. From FIG. 6, it can be understood that, when the water/methane ratio was changed in the range of 0 to 2.5, the hydrogen/carbon monoxide ratio changed in the range of 3.7 to 11.4. FIG. 6 demonstrated a tendency toward increase in the hydrogen/carbon monoxide ratio as the water/methane ratio increased from 1.0. This is because carbon monoxide was oxidized to carbon dioxide.

Example 5

The same steam reforming of methane as in Example 1 was repeated, except that the reforming was continuously carried out over 10 hours under the conditions of an applied voltage of 7.2 to 7.4 kV, and a consumed electric power at the primary side of 19.5 to 20.5 W.

Figure 7:
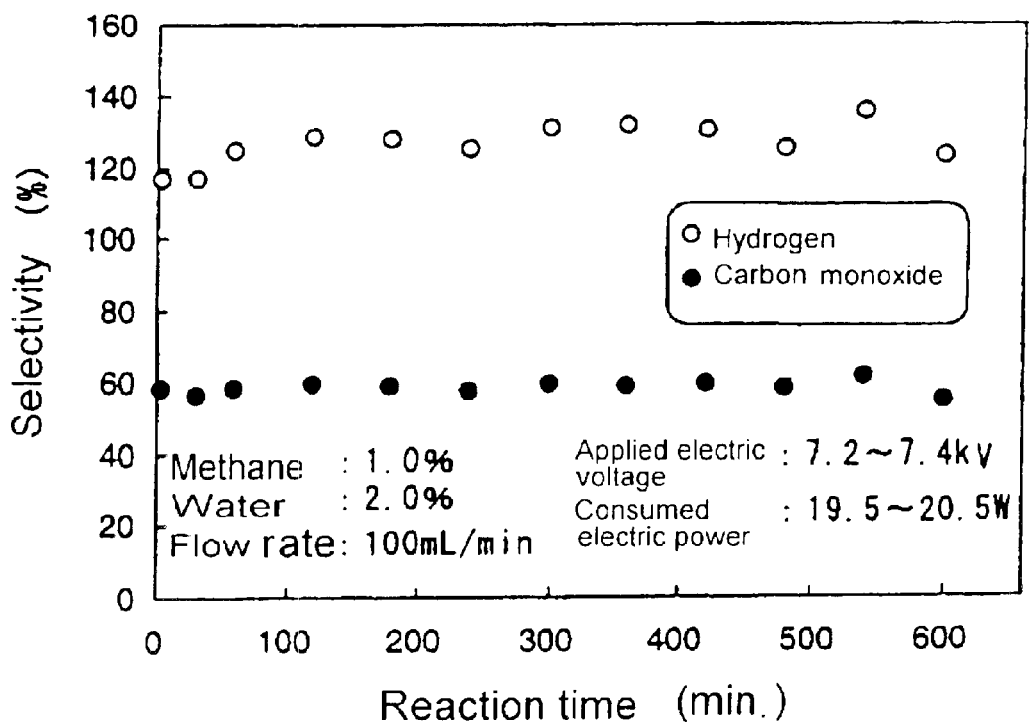
FIG. 7 is a graph showing selectivity of hydrogen and carbon monoxide, each plotted against reaction time in Example 4.

The thus-obtained results are shown in FIG. 7. From FIG. 7, it can be understood that 120% hydrogen selectivity and 60% carbon monoxide selectivity were maintained in Example 4. This result demonstrates that the method of the present invention made it possible to run the reforming reaction system continuously and stably for a long period of time.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A process for the production of hydrogen, which comprises subjecting a hydrogen-containing compound (with the exception of a nitrogen-containing compound) to a decomposition reaction with nonthermal plasma, wherein the hydrogen-containing compound is at least one compound selected from the group consisting of a hydrocarbon, an alcohol and water, wherein a ferroelectric substance is packed in an apparatus, and wherein the decomposition reaction is carried out in a temperature range from room temperature to 200° C.

2. The process according to claim 1, wherein the decomposition reaction is carried out in an atmosphere of an inert gas.

3. The process according to claim 1, wherein the decomposition reaction is carried out continuously.

4. The process according to claim 1, wherein the decomposition reaction is carried out in an electron temperature range of 30,000–40,000° C.

5. The process according to claim 1, wherein the decomposition reaction is carried out at a temperature sufficient to cause the decomposition reaction for generating hydrogen at 200° C. or less.

6. The process according to claim 1, wherein the decomposition reaction is carried out at a temperature sufficient to cause the decomposition reaction.

* * * * *